United States Patent
Strojny

[11] Patent Number: 5,947,556
[45] Date of Patent: Sep. 7, 1999

[54] CHILD SEAT FOR A VEHICLE

[75] Inventor: Pawel Strojny, Tutzing, Germany

[73] Assignee: Bayerische Motoren Werke Aktiengesellschaft, Munich, Germany

[21] Appl. No.: 08/887,293

[22] Filed: Jul. 2, 1997

[30] Foreign Application Priority Data

Jul. 2, 1996 [DE] Germany .............................. 196 26 641

[51] Int. Cl.⁶ ..................................................... B60N 2/28
[52] U.S. Cl. .................................. 297/256.16; 297/183.1; 297/130
[58] Field of Search .............................. 297/130, 256.13, 297/256.16, 183.1, 183.3, 183.2

[56] References Cited

U.S. PATENT DOCUMENTS

| | | | |
|---|---|---|---|
| 4,915,446 | 4/1990 | Darling et al. | 297/256.13 X |
| 5,052,750 | 10/1991 | Takahashi et al. | 297/256.16 X |
| 5,277,475 | 1/1994 | Freese et al. | |
| 5,364,137 | 11/1994 | Shimer | 297/130 X |
| 5,478,135 | 12/1995 | Kain | 297/256.16 |
| 5,772,279 | 6/1998 | Johnson et al. | 297/256.16 X |

FOREIGN PATENT DOCUMENTS

| | | |
|---|---|---|
| 3634501A1 | 4/1987 | Germany . |
| 4006030A1 | 8/1990 | Germany . |
| 9203620 | 6/1992 | Germany . |
| 4137599 | 5/1993 | Germany .......................... 297/256.16 |
| 2136686 | 9/1984 | United Kingdom . |

*Primary Examiner*—Peter R. Brown
*Attorney, Agent, or Firm*—Evenson, McKeown, Edwards & Lenahan, P.L.L.C.

[57] ABSTRACT

A child seat is composed of a base, which can be fastened on a vehicle seat, as well as of a removable shell part. In order to be able to carry out an inclination adjustment of the shell part with respect to the base also during the drive without any safety risk, a connection element is provided in the form of a bolt which can take up three positions. In the locking position with the inclination of the shell part is fixed, the bolt penetrates a locking strip with several detent openings. In the securing position, the bolt no longer engages in the locking strip so that the inclination of the shell part can be changed. However, the bolt still reaches behind a stop which prevents a release of the shell part from the base. The shell part can be removed from the base only in the removal position of the bolt.

20 Claims, 4 Drawing Sheets

CHILD SEAT FOR A VEHICLE

BACKGROUND AND SUMMARY OF THE INVENTION

This application claims the priority of German application 196 26 641 filed on Jul. 2, 1996, the disclosure of which is expressly incorporated by reference herein.

The invention relates to a child seat for a vehicle, having a shell part for accommodating the child and a base which can be fastened on a vehicle seat, the shell part being releasably connected with the base by way of a coupling device, and having a device for adjusting the inclination of the shell part with respect to the base.

From German Patent Document DE 40 06 030 A1 of the firm Spalding & Evenflo Co., a Reboard child seat is known which is composed of a shell part and a base. The shell part accommodates the child by way of its own belt system. The base, in turn, must be fastened on a vehicle seat by way of the vehicle-side safety belt. A coupling device establishes a secure connection between the shell part and the base. For use outside the vehicle, the shell part can be separated from the base by way of the coupling device.

It is a disadvantage that the form-locking connection between the shell part and the base is eliminated during the adjusting operation. If the inclination of the shell part is to be changed also during the drive, for example, when, during the drive, the child falls asleep in the sitting position of the shell part, the desired adjusting can take place only with a correspondingly high safety risk because there will no longer be a connection between the shell part and the base during the adjusting movement. For safety reasons, the drive must therefore be interrupted.

It is an object of the invention to develop the known child seat such that, also when the inclination of the shell part is adjusted, a secure connection is ensured between the shell part and the base.

This object is achieved according to preferred embodiments of the invention by providing an arrangement wherein the coupling device has at least one connection element which selectively assumes a locking position, a securing position and a removal position, the locking position provided with a form closure between the connection element and the shell part or the base in a direction of an inclination adjustment as well as in a release direction in which the shell part can be removed from the base, wherein the securing position accommodates a free movement in the direction of the inclination adjustment and with a form closure in the release direction, and wherein the removal position accommodates a free movement in the direction of the inclination adjustment as well as in the release direction.

The connection element, which according to the invention can take up an intermediate position (securing position) in which an adjustment of the inclination is possible but at the same time a movement in the release direction of the shell part is prevented, can therefore be arranged on the shell part as well as on the base and therefore acts in a form-locking manner either upon the base or upon the shell part. By means of the invention, a secure adjustment of the inclination is made possible also during the drive so that, for changing the inclination of the shell part, the drive must no longer be interrupted.

The invention can be implemented by a single connection element or by several connection elements or groups of connection elements. In this case, the locking, securing or removal position can also be taken up by respectively different connection elements. The form-locking can take place by a punctiform or flat contact between the connection element (or connection elements) and correspondingly designed areas of the base or of the shell part.

According to advantageous aspects of preferred embodiments of the invention, a step-by-step adjustment of the inclination of the shell part is achieved in that a pin-type connection element engages in different openings of a locking strip. In the securing position of the connection element, the connection element is outside the locking strip but still reaches behind a stop so that an unintentional releasing of the shell part from the base (for example, in the case of a vehicle crash) becomes impossible.

In certain preferred embodiments of the invention, a displacement of the connection element is provided in the transverse direction of the child seat by means of an inclined stop surface. The transverse displacement of the connection element can take place in a direct manner, for example, by a section which is arranged on the connection element and which runs up on the inclined plane. In certain preferred embodiments an indirect displacement of the connection element is provided by way of a lever which, in turn, interacts with the inclined plane.

According to certain preferred embodiments of the invention, after the adjustment of the inclination is completed, an automatic locking of the connection element is achieved into the respective nearest opening of the locking strip.

According to certain preferred embodiments of the invention, the connection element is arranged on the shell part side and is moved together with the lever which, corresponding to the respective usage position of the child seat, can take up different positions. The locking strip and the stop are arranged on the base which, as a rule, is constructed as a frame formed of steel tubes. In a particularly advantageous manner, the lever can be constructed as a component of a carrying bow of the shell part.

Other objects, advantages and novel features of the present invention will become apparent from the following detailed description of the invention when considered in conjunction with the accompanying drawings.

DETAILED DESCRIPTION OF THE DRAWINGS

Figure 1A:
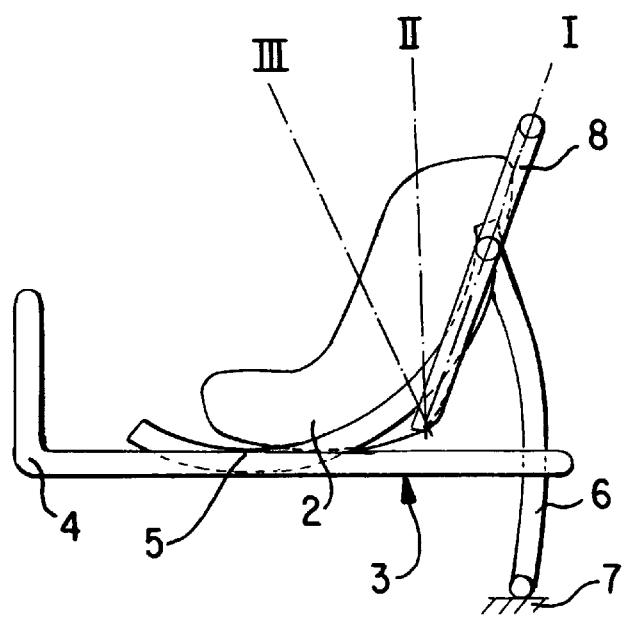
FIGS. 1a and 1b are schematic lateral views of a child seat constructed according to preferred embodiments of the invention and showing differently inclined shell parts.
Figure 1B:
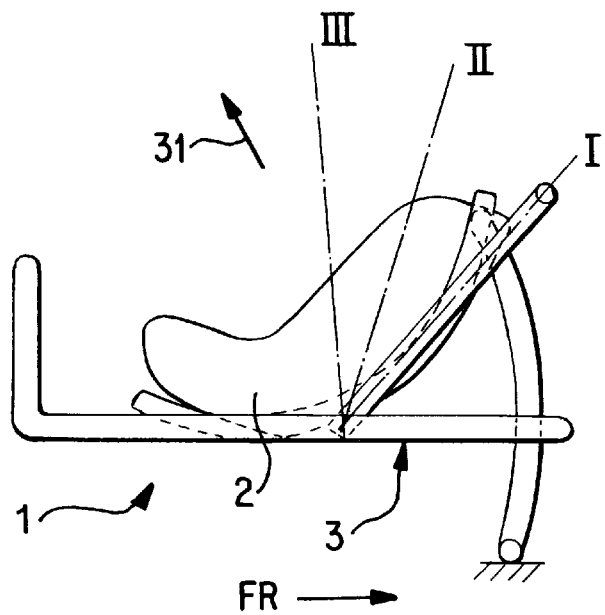

FIGS. 1a and 1b are simplified basic diagrams of a child seat 1. The child seat 1 is composed of a shell part 2 and of a base 3.

The base 3 consists essentially of an L-shaped frame 4 to which a bent tube 5 is linked for adjusting the inclination of the shell part 2. A support 6 supports the base 3, which is fastened by way of the vehicle-side safety belt to a vehicle seat, with respect to the vehicle floor 7. As mentioned above, the inclination of the shell part 2 can be adjusted with respect to the base 3. The two representations of FIG. 1 show the shell part 2 in the sitting and lying position for a child. For a use outside the vehicle, the shell part 2 can be removed from the base 3 (release direction 31). For this purpose, a carrying bow 8 is provided. By way of the carrying bow 8, the separation of the shell part 2 and the base 3 takes place as well as the adjustment of the inclination of the shell part 2. For this purpose, the carrying bow 8 can take up positions I to III.

Figure 2:
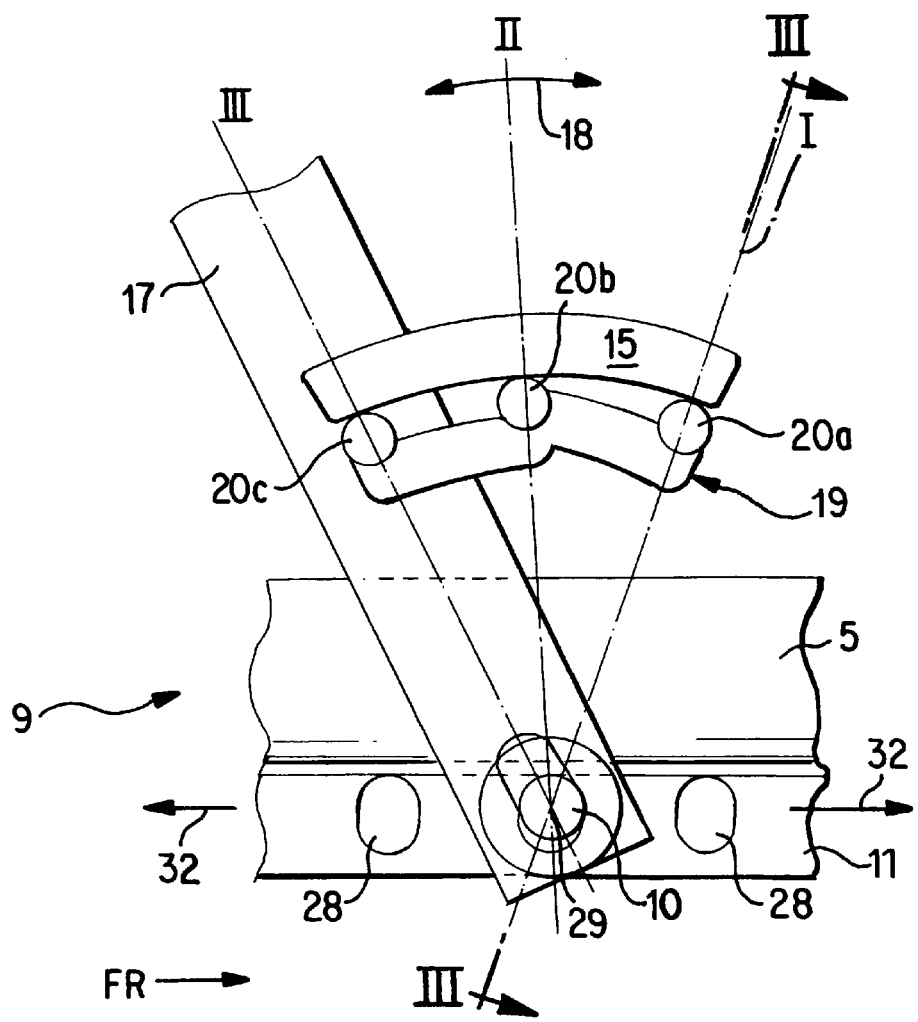
FIG. 2 is a lateral view of the area of a coupling device of a first embodiment of the invention.
Figure 2A:
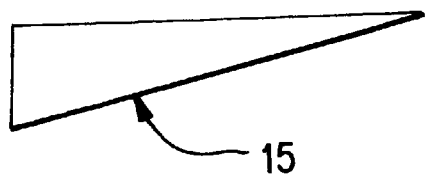
FIG. 2a is a top view of the inclined surface of FIG 2.
Figure 3:
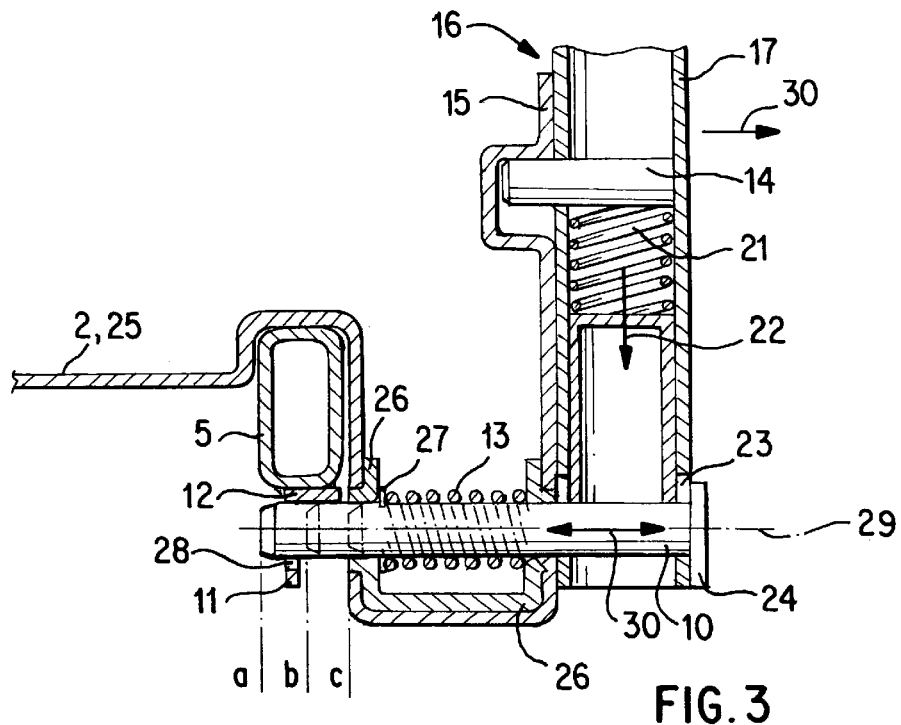
FIG. 3 is a sectional view along the intersection line A—A in FIG. 2.

The connection between the shell part 2 and the base 3 takes place by way of coupling devices at each side which, as a whole, has the reference number 9. The coupling devices 9 extend in the longitudinal direction of the child seat 1 and are symmetrically arranged on the two lateral areas of the child seat 1. FIGS. 2 and 3 each show the right coupling device 9 of a child seat 1 installed in the vehicle against the driving direction FR (see FIG. 1).

The coupling device 9 essentially consists of a bolt 10, a locking strip 11, a stop 12, a pressure spring 13 and an arm 17 of the supporting bow 8. In its area 16, the arm rests against an inclined surface 15 of the base 3. Together with a plane which extends vertically in the longitudinal direction of the child seat 1, the inclined surface 15 encloses an acute angle and forms a circular arc around the axis of rotation 29 of the arm 17, as illustrated particularly in FIG. 2. During the swivelling of the arm 17 in the direction of the arrow 18, the arm 17, which rests against the inclined surface 15 of the shell part 2, is moved in the transverse direction 30 of the child seat 1. Below the inclined surface 15, a connecting link 19 for a pin 14 arranged on the arm 17 is provided, which connecting link has three detent openings 20a, b, c. For changing the pin 14 between the individual detent openings 20a to c, the arm 17 must be moved in the direction of the arrow 22 against the force of a pressure spring 21 arranged in the interior of the arm 17. For this purpose, the arm 17 is disposed on the bolt 10 by way of an oblong hole 23.

The bolt 10 penetrates the arm 17 and a shell-part-side bearing consisting of a support part 25 and a reinforcing part 26 in order to then continue below the tube 5 of the base 3. The stop 12 and the locking strip 11 are arranged on the tube 5. Between the reinforcing part 26, which is bent in a U-shape, the pressure spring 13 is inserted which, by way of a ring 27, which is form-lockingly connected with the bolt 10, prestresses the bolt 10 in the direction of the center of the child seat 1. The locking strip 11 is provided with several detent openings 28 which are constructed as oblong holes. The axis of rotation 29 of the carrying bow 8 is identical with the center axis of the bolt 10.

The operation of the coupling device 9 will be explained in detail in the following As a function of the position of the carrying bow 8 (I, II, III), the bolt 10 takes up the positions a, b or c. The individual positions are illustrated by solid (locking position a) and broken (securing position b and removal position c) lines. In position I of the arm 17 of the carrying bow 8, the bolt 10 is in the locking position a; that is, because of the force of the pressure spring 13, it is engaged maximally in the direction of the center of the child seat 1. In this position, it penetrates one of the detent openings 28 of the locking strip 11. This fixes the inclination of the shell part 2 with respect to the base 3. In addition, the shell part 2 cannot be removed from the base 3.

When the arm 17 is changed into position II, the arm 17 is pressed toward the outside in the direction of the arrow 30. By way of the head section 24 of the bolt 10, the bolt 10 is also correspondingly shifted in the direction of the arrow 30 and takes up its securing position marked b. In position II of the arm 17, the inclination of the shell part 2 can be changed with respect to the base 3 in the direction of the arrows 32 because the bolt 10 no longer engages in the locking strip 11. However, the bolt 10 still reaches around the stop 12 so that the shell part 2 cannot be removed from the base 3. Also in the case of a strong braking of the vehicle or in the case of crash-caused high deceleration values, the connection between the shell part 2 and the base 3 and thus between the shell part 2 and the vehicle is maintained. Only in position III of the arm 17, the bolt 10 will be displaced maximally to the outside (removal position) and will now release the shell part 2.

Figure 4:
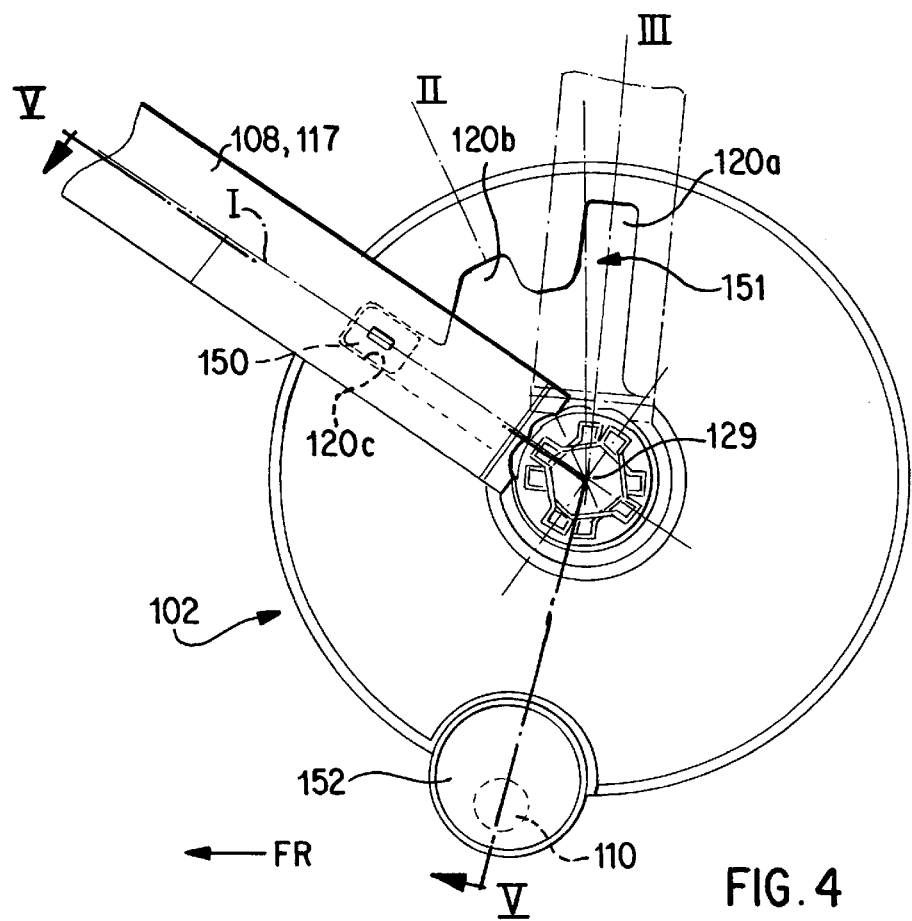
FIG. 4 is a lateral view of the area of the coupling device of a second embodiment of the invention.
Figure 5:
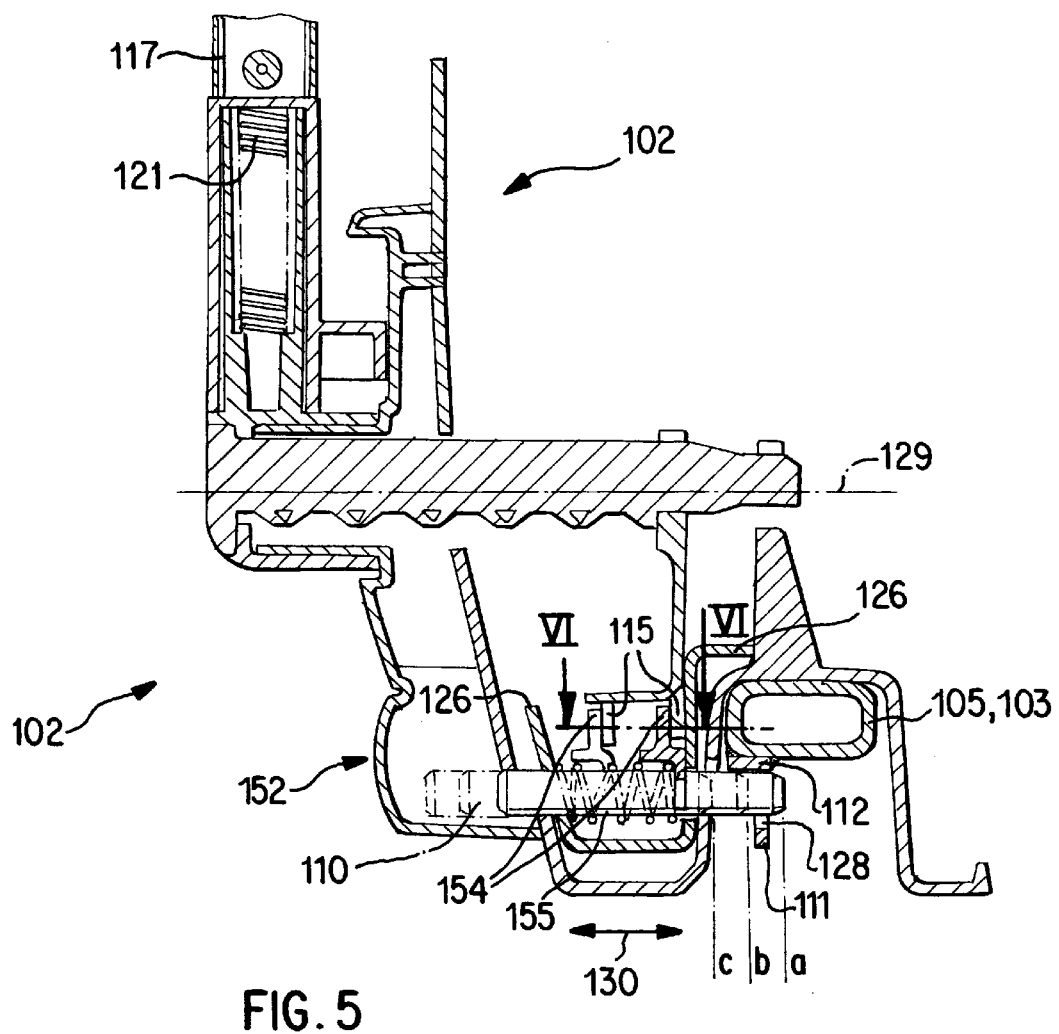
FIG. 5 is a lateral view along the intersection line V—V in FIG. 4.
Figure 6:
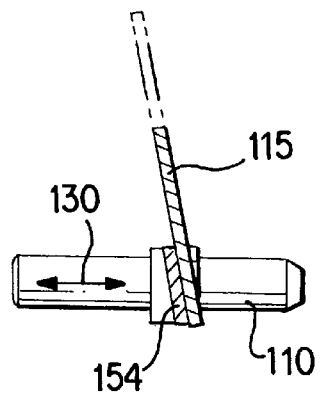
FIG. 6 is a sectional view along the intersection line VI—VI in FIG. 5.

FIGS. 4 to 6 show a second embodiment of the invention. In this case, a left side of the child seat 101 is shown which is installed in a vehicle against the driving direction FR. While, according to FIGS. 2 and 3, the axis of rotation 29 is situated below the inclined surface 15, the child seat 101 of the second embodiment has an axis of rotation 129 which is arranged above an inclined surface 115.

An arm 117 of a carrying bow 108 is rotatably (axis of rotation 129) disposed on a shell part 102 of the child seat 101. On the interior side, the arm 117 is provided with a pressure spring 121. On the arm 117, a sliding block 150 is arranged to which a connecting link 151 on the shell part 102 is assigned. Corresponding to the three recesses 120a, b and c of the connecting link 151, the arm 117 can take up the positions I to III. Below the axis of rotation 129, a bolt 110 is situated behind a covering 152 of the shell part 102.

The bolt 110 is disposed to be displaceable in the transverse direction 130 of the child seat 101 and penetrates, on the one hand, the body 125 of the shell part 102 as well as a reinforcing plate 126 and, on the other hand, in its innermost position a, one of several detent openings 128 of a locking strip 111. Like the stop 112, the locking strip 111 is welded to a tube 105 of the base 103. For the transverse displacement of the bolt 110, this bolt carries a fitted-on element 154 which is inserted into a groove 155 of the bolt 110.

As illustrated particularly in FIG. 6, the element 154 as well as an inclined surface 115 on the shell part 102 are arranged at an acute angle with respect to a plane extending vertically in the longitudinal direction of the child seat 101. With the swivelling of the arm 117, the element 154 travels along this inclined surface 115 whereby the bolt 110 is displaced in the transverse direction of the child seat 101 (arrow 130). Thus, by means of the adjustment of the carrying bow 108, the bolt 110, as described above by means of the first embodiment, is displaced between positions a to c so that the shell part 102 is either locked with the base 103, can be adjusted in its inclination or can be removed from the base 103.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Child seat assembly for a vehicle comprising:
a child accommodating shell part;
a base fastenable to a vehicle seat;
a coupling device connecting the shell part to the base and permitting inclination adjustment of the shell part with respect to the base, said coupling device including a connection element movable between:
- a locking position wherein said connection element is engaged in a selected one of a plurality of openings in the base to fix the shell part to the base in a selected inclined position,
- a securing position wherein said connection element is disengaged from said selected opening in the base to permit inclination of the shell part with respect to the base, and wherein said connection element abuts a stop to prevent release of the shell part from the base, and
- a removal position wherein said connection element is disengaged from said selected opening in the base and is disengaged from said stop to permit removal of the shell part from the base; and means for moving said connection element between said locking, securing, and removal positions.

2. Child seat according to claim 1, wherein the connection element has a pin-shaped construction and is displaceable in a transverse direction of the child seat, said openings in the base being located in a locking strip fixed to said base.

3. Child seat according to claim 2, wherein said means for moving said connection element comprises an inclined surface of said shell part which encloses an acute angle with a plane extending in parallel to the vertical longitudinal center plane of the child seat.

4. Child seat according to claim 3, wherein the connection element has a fitted-on element attached thereto which interacts with the inclined surface.

5. Child seat according to claim 3, wherein said means for moving said connection element further comprises a lever, the connection element being arranged on the lever and the lever being displaceable via engagement with the inclined surface in the transverse direction of the child seat.

6. Child seat according to claim 5, wherein the connection element is spring-loaded in the direction of said locking position.

7. Child seat according to claim 6, wherein the lever is a component of a U-shaped handle for the shell part and is constructed to be lockable in the individual positions of the connection element.

8. Child seat according to claim 5, wherein the stop is arranged on the base and the lever is swivellably disposed on the shell part.

9. Child seat according to claim 8, wherein the lever is a component of a U-shaped handle for the shell part and is constructed to be lockable in the individual positions of the connection element.

10. Child seat according to claim 5, wherein the lever is a component of a U-shaped handle for the shell part and is constructed to be lockable in the individual positions of the connection element.

11. Child seat according to claim 4, wherein the connection element is spring-loaded in the direction of said locking position.

12. Child seat according to claim 4, wherein the stop is arranged on the base.

13. Child seat according to claim 3, wherein the connection element is spring-loaded in the direction of said locking position.

14. Child seat according to claim 3, wherein the stop is arranged on the base.

15. Child seat according to claim 2, wherein the connection element is spring-loaded in the direction of said locking position.

16. Child seat according to claim 2, wherein the stop is arranged on the base.

17. Child seat according to claim 1, wherein the connection element is spring-loaded in the direction of said locking position.

18. Child seat according to claim 17, wherein the stop is arranged on the base.

19. Child seat according to claim 1, wherein the stop is arranged on the base.

20. Child seat for a vehicle, comprising:
- a base to be fastened on a vehicle seat, said base including a locking strip defining a plurality of openings;
- a shell part for accommodating a child, said shell part being releasably connectable to said base via a connection element, said connection element being selectively engageable in any one of said openings to adjust the inclination of the shell part relative to the base;
- a lever rotatably disposed on said shell part, said lever being selectively rotatable between a first position, a second position, and a third position;
- said shell part including an inclined surface abutting said lever or a fitted-on element of said connection element;
- wherein as said lever is selectively rotated between said first, second, and third positions, said connection element is correspondingly moved via said inclined surface between the following positions, respectively:
  (a) a locking position wherein said connection element is engaged in one of said openings;
  (b) a securing position wherein said connection element is disengaged from said openings and said connection element abuts a stop on said base; and
  (c) a removal position wherein said connection element is disengaged from said openings and clear of said stop.

* * * * *